(No Model.)

W. J. & J. J. CARTER.
JOURNAL BEARING.

No. 520,295. Patented May 22, 1894.

WITNESSES
Geo. M. Anderson
Phil C. Masi

INVENTORS
William J. Carter
John J. Carter,
by E. W. Anderson
their Attorney

THE NATIONAL LITHOGRAPHING COMPANY,
WASHINGTON, D. C.

UNITED STATES PATENT OFFICE.

WILLIAM J. CARTER AND JOHN J. CARTER, OF DUBLIN, GEORGIA.

JOURNAL-BEARING.

SPECIFICATION forming part of Letters Patent No. 520,295, dated May 22, 1894.

Application filed May 4, 1893. Renewed March 22, 1894. Serial No. 504,723. (No model.)

*To all whom it may concern:*

Figure 1:
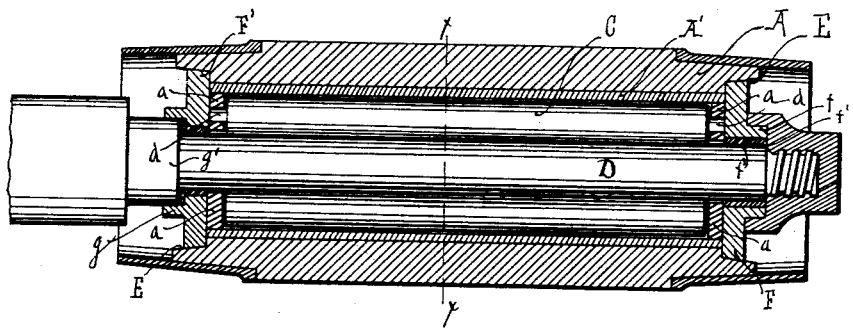
Figure 2:
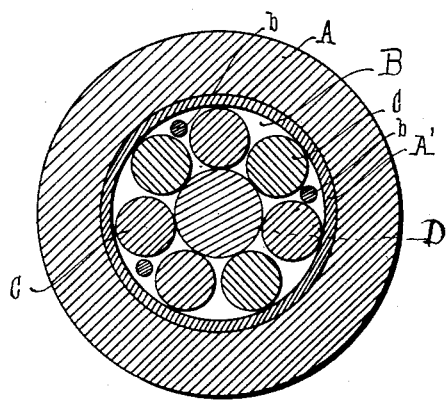

Be it known that we, WILLIAM J. CARTER and JOHN J. CARTER, citizens of the United States, and residents of Dublin, in the county of Laurens and State of Georgia, have invented certain new and useful Improvements in Journal-Bearings; and we do declare the following to be a full, clear, and exact description of the invention, such as will enable others skilled in the art to which it appertains to make and use the same, reference being had to the accompanying drawings, and to letters of reference marked thereon, which form a part of this specification.
Figure 1 of the drawings is a vertical longitudinal section. Fig. 2 is a transverse section through the bearing.

This invention has relation to certain new and useful improvements in journal bearings;
and it consists in the novel construction and combination of parts, all as hereinafter described and pointed out in the claim.

In the accompanying drawings, we have shown the invention as applied to a hub for road vehicles, but we desire it understood that the invention is equally applicable to other forms of bearings.

In the said drawings, the letter A designates the hub or boxing, having the bushing A', which forms the bearing chamber B. In said chamber is a roller bearing C, which consists of two parallel annular rings $a, a$, fitting the interior of said chamber B, one at each end thereof, and connected with each other by means of longitudinal rods $b$. Journaled in said rings, around a central opening is a series of longitudinal cylinder rollers C, which form the main bearing for the shaft or spindle D. The said rollers, as well as the bearing chamber, are designed to be of considerable length, in order to provide an extended bearing for the shaft. Upon the ends of said rollers are small journals $d$, which engage bearings in the rings $a, a$.

At each end of the hub or boxing A, beyond the bushing A', is an enlarged circular chamber E, and in these chambers are held the end bearings F, F'. The end bearing F in the construction indicated is provided with a
boss $f$, upon its outer face, surrounding the
central opening $f'$ thereof, said boss having a bushing $f^2$. The opposite end bearing F' in the construction shown also has a boss $g$, chambered to receive an enlarged portion or
boss $g'$ on the shaft.

Having thus described this invention, what we claim as new, and desire to secure by Letters Patent, is—

In a journal bearing, the combination of
the boxing, the chamber B therein, the enlarged chambers E at the end portions of said boxing, the longitudinal rollers C in said chamber B, the rings $a, a$ seated in the end portions of said chamber B, and in which said
rollers have end bearings, and the bearing
plates F, F' seated in the respective chambers E, and having each an opening for the shaft, the opening in the plate F having a surrounding outwardly extending boss $f$, hav-
ing a bushing $f^2$ therein, and the plate F'
having a boss $g$ chambered to receive an enlarged portion of the shaft, substantially as specified.

In testimony whereof we affix our signatures in presence of two witnesses.

W. J. CARTER.
J. J. CARTER.

Witnesses:
A. T. SUMMERDIE,
J. E. HIGHTOWER.